(12) United States Patent
Kushalappa et al.

(10) Patent No.: US 9,731,456 B2
(45) Date of Patent: Aug. 15, 2017

(54) METHOD OF MANUFACTURING A FUNCTIONALLY GRADED ARTICLE

(71) Applicant: SABIC Innovative Plastics IP B.V., Bergen op Zoom (NL)

(72) Inventors: Poovanna Theethira Kushalappa, Bangalore (IN); Sudhakar Ramamoorthy Marur, Bangalore (IN); Hariharan Ramalingam, Bangalore (IN); Sadasivam Golakrishanan, Tamil Nadu (IN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 445 days.

(21) Appl. No.: 13/827,012

(22) Filed: Mar. 14, 2013

(65) Prior Publication Data

US 2014/0272119 A1    Sep. 18, 2014

(51) Int. Cl.
*B29C 70/88* (2006.01)
*B29C 70/62* (2006.01)
(Continued)

(52) U.S. Cl.
CPC .......... *B29C 70/62* (2013.01); *B29C 45/0013* (2013.01); *B29C 70/88* (2013.01); *B29C 70/882* (2013.01); *C08J 5/00* (2013.01); *C08J 5/041* (2013.01); *C08K 9/02* (2013.01); *C08K 9/04* (2013.01); *C08K 9/10* (2013.01); *C23C 26/00* (2013.01); *B29K 2995/0003* (2013.01); *C08J 2323/06* (2013.01); *C08J 2323/12* (2013.01); *C08J 2325/06* (2013.01); *C08J 2367/02* (2013.01); *C08J 2367/04* (2013.01); *C08J 2369/00* (2013.01); *C08K 2003/0843* (2013.01); *C08K 2003/0856* (2013.01);
(Continued)

(58) Field of Classification Search
None
See application file for complete search history.

(56) References Cited

U.S. PATENT DOCUMENTS 3,649,337 A   3/1972   Johnson et al.
3,659,003 A   4/1972   Johnson et al.
(Continued)

FOREIGN PATENT DOCUMENTS

CN    102964531 A    3/2013
EP    0451266 A1    10/1991
(Continued)

OTHER PUBLICATIONS

English Machine Translation of JP 200140936.*
(Continued)

*Primary Examiner* — Edmund Lee
(74) *Attorney, Agent, or Firm* — Cantor Colburn LLP (57) ABSTRACT

Disclosed herein are methods for manufacturing a functionally graded polymer material. The methods comprise preparing a melted polymer mixture comprising a thermoplastic polymer and a magnetic filler dispersed in the thermoplastic polymer, molding the melted polymer mixture and applying a magnetic field to a portion of the melted polymer mixture to form a functionally graded polymer material. The resulting functionally graded polymer material has a magnetic filler gradient formed through a thickness of the material.

19 Claims, 5 Drawing Sheets

(51) Int. Cl.
*C23C 26/00* (2006.01)
*B29C 45/00* (2006.01)
*C08J 5/00* (2006.01)
*C08J 5/04* (2006.01)
*C08K 9/02* (2006.01)
*C08K 9/10* (2006.01)
*C08K 9/04* (2006.01)
*C08K 3/08* (2006.01)
*C08K 3/22* (2006.01)

(52) U.S. Cl.
CPC ......... *C08K 2003/0862* (2013.01); *C08K 2003/2272* (2013.01); *C08K 2003/2275* (2013.01); *C08K 2003/2293* (2013.01); *C08K 2201/01* (2013.01)

(56) References Cited

U.S. PATENT DOCUMENTS

| | | | |
|---|---|---|---|
| 3,856,883 | A | 12/1974 | Dickie et al. |
| 4,075,421 | A | 2/1978 | McCullough |
| 4,726,901 | A | 2/1988 | Pall et al. |
| 4,777,090 | A | 10/1988 | Ovshinsky et al. |
| 4,917,963 | A | 4/1990 | Kittler |
| 4,997,708 | A | 3/1991 | Kawachi et al. |
| 5,108,678 | A | 4/1992 | Hirasaka et al. |
| 5,126,886 | A | 6/1992 | Richardson et al. |
| 5,235,660 | A | 8/1993 | Perry et al. |
| 5,418,063 | A | 5/1995 | Booth |
| 5,455,000 | A | 10/1995 | Seyferth et al. |
| 5,545,368 | A * | 8/1996 | Vinarcik ............ B22D 19/02 264/310 |
| 5,639,805 | A | 6/1997 | Park et al. |
| 5,756,573 | A | 5/1998 | Trumbo et al. |
| 5,800,839 | A | 9/1998 | Kudo et al. |
| 5,895,716 | A | 4/1999 | Fiala et al. |
| 6,057,406 | A | 5/2000 | Pojman et al. |
| 6,110,544 | A | 8/2000 | Yang et al. |
| 6,143,219 | A | 11/2000 | Vidaurre et al. |
| 6,207,349 | B1 | 3/2001 | Lewis |
| 6,251,334 | B1 | 6/2001 | Lewis |
| 6,521,152 | B1 | 2/2003 | Wood et al. |
| 6,534,194 | B2 | 3/2003 | Weihs et al. |
| 6,641,893 | B1 | 11/2003 | Suresh et al. |
| 6,672,902 | B2 | 1/2004 | Skinner et al. |
| 6,737,145 | B1 | 5/2004 | Watanabe et al. |
| 7,087,341 | B2 | 8/2006 | Hampden-Smith et al. |
| 7,101,927 | B2 | 9/2006 | Chen et al. |
| 7,173,083 | B2 | 2/2007 | Scheerder et al. |
| 7,947,773 | B2 | 5/2011 | Hansen et al. |
| 8,291,360 | B2 | 10/2012 | Higuchi et al. |
| 2003/0165710 | A1 | 9/2003 | Kuramoto et al. |
| 2004/0046497 | A1 | 3/2004 | Schaepkens et al. |
| 2004/0116026 | A1 | 6/2004 | Kubose et al. |
| 2004/0188870 | A1 | 9/2004 | Fournier et al. |
| 2005/0214479 | A1 | 9/2005 | Erben et al. |
| 2006/0029795 | A1 | 2/2006 | Sawyer et al. |
| 2006/0081326 | A1 | 4/2006 | Zelin et al. |
| 2006/0180707 | A1 | 8/2006 | Dorfman |
| 2007/0116766 | A1 | 5/2007 | Amick |
| 2007/0148346 | A1 | 6/2007 | Kim et al. |
| 2008/0092814 | A1 | 4/2008 | Yan et al. |
| 2009/0069169 | A1 | 3/2009 | Bauer |
| 2009/0291268 | A1* | 11/2009 | Feng ............ B29C 70/62 428/195.1 |

FOREIGN PATENT DOCUMENTS

| | | |
|---|---|---|
| EP | 0463204 A1 | 1/1992 |
| EP | 1543890 A1 | 6/2005 |
| GB | 728220 | 4/1955 |
| GB | 1332070 | 10/1973 |
| GB | 1389911 | 4/1975 |
| GB | 1443004 | 7/1976 |
| JP | 58211322 * | 12/1983 |
| JP | 60229321 A | 11/1985 |
| JP | 1101612 A | 4/1989 |
| JP | 1228817 A | 9/1989 |
| JP | 4332634 A | 11/1992 |
| JP | 5138780 A | 6/1993 |
| JP | 5192983 A | 8/1993 |
| JP | H0681117 | 3/1994 |
| JP | 8008134 A | 1/1996 |
| JP | 08248686 | 9/1996 |
| JP | H08248686 A | 9/1996 |
| JP | 9131828 A | 5/1997 |
| JP | 10035809 | 2/1998 |
| JP | 10298292 A | 11/1998 |
| JP | 2000140936 | 5/2000 |
| JP | 2000140936 A | 5/2000 |
| JP | 2000141392 | 5/2000 |
| JP | 2000141392 A | 5/2000 |
| JP | 2000204475 A | 7/2000 |
| JP | 2000319428 A | 11/2000 |
| JP | 2001310943 A | 11/2001 |
| JP | 2001310947 A | 11/2001 |
| JP | 2001354711 A | 12/2001 |
| JP | 2002059439 A | 2/2002 |
| JP | 201191095 A | 5/2011 |
| JP | 2011091095 | 5/2011 |
| KR | 20100051496 A | 5/2010 |
| WO | 9216702 A1 | 10/1992 |
| WO | 9402313 A1 | 2/1994 |
| WO | 9415005 A1 | 7/1994 |
| WO | 9931144 A1 | 6/1999 |
| WO | 9937212 A1 | 7/1999 |
| WO | 02080202 A1 | 10/2002 |
| WO | 2004044654 A2 | 5/2004 |
| WO | 2005000529 A1 | 1/2005 |
| WO | 2007140192 A2 | 12/2007 |

OTHER PUBLICATIONS

English Abstract of WO/02080202; Date of Publication Oct. 10, 2002; 2 Pages.
International Search Report for International Application No. PCT/IB2014/059371; International Filing Date: Mar. 2, 2014; Date of Mailing: Jul. 3, 2014; 5 Pages.
Machine Translation of CN102964531(A) ; Date of Publication: Mar. 13, 2013; 21 Pages.
Written Opinion of the International Searching Authority for International Application No. PCT/IB2014/059371; International Filing Date: Mar. 2, 2014; Date of Mailing: Jul. 3, 2014; 4 Pages.
Indian Publication No. 200700680; Date of Publication: Jan. 2, 2009; Abstract Only; 2 Pages.
Indian Publication No. 200700681; Date of Publication: Jan. 2, 2009; Abstract Only; 2 Pages.
Indian Publication No. 200700731; Date of Publication: Jan. 16, 2009; Abstract Only; 2 Pages.
Furukawa et al.; "Aggregation Structure and Mechanical Properties of Functionally Graded Polyurethane Elastomers"; Journal of Polymer Science: Part B: Polymer Physics; vol. 41; 2003; pp. 2355-2363.
Gupta; "A Functionally Graded Syntactic Foam Material for High Energy Absorption Under Compression"; Materials Letters; vol. 61; 2007; pp. 979-982.
Hu et al.; "Aliphatic/Aromatic Hybrid Polymers for Functionally Graded Radiation Shielding"; High Performance Polymers; vol. 18; 2006; pp. 213-225.
Koide et al.; "Influence of a Melt Flow on Generation of Functionally Graded Structure in Bulk Polymeric Materials Under Uniaxial Thermal Gradient"; Macromolecular Chemistry and Physics; vol. 209; 2008; pp. 499-507.
Torres-Sanchez et al.; "Toward Functionally Graded Cellular Microstructures"; Journal of Mechanical Design; vol. 131; Sep. 2009; 7 Pages.
Zhou et al.; Fabrication of Functionally Graded Porous Polymer via Supercritical CO2 Foaming; Composites: Part B; vol. 42; 2011; pp. 318-325.

(56) References Cited

OTHER PUBLICATIONS

Japanese Patent No. JPH0681117; Date of Publication: Mar. 22, 1994; Machine Translation; 6 Pages.

* cited by examiner

Steel filler gradient

METHOD OF MANUFACTURING A FUNCTIONALLY GRADED ARTICLE

BACKGROUND

The present disclosure relates to functionally graded polymer materials and to methods of making functionally graded polymer articles.

Functionally graded materials are characterized by change in the composition and structure of a material over volume. Traditionally, processes of making functionally graded materials have been limited to manufacturing techniques such as impregnation of porous materials with functional nanoparticles, formation of organic/inorganic nanostructured coatings by electrophoretic disposition (EPD), electrodeposition of metal matrix composite (MMC), chemical vapor deposition, and functionally graded thermal barrier (TGM TBC) coatings, electric field assisted processing of materials, and dispensing systems for thermosetting and thermoplastic adhesives, to name a few. However, these methods are typically slow and expensive.

It is therefore desirable to develop methods for making functionally graded polymer articles which are both efficient and cost-effective.

SUMMARY

Disclosed herein are methods of making functionally graded polymer articles and articles made therefrom.

In one embodiment, a method of manufacturing a functionally graded article, comprises: preparing a melted polymer mixture comprising a thermoplastic polymer and a magnetic filler, wherein the magnetic filler is dispersed in the thermoplastic polymer; molding the melted polymer mixture; and applying a magnetic field to a portion of the melted polymer mixture to form the functionally graded article, wherein the functionally graded article has a magnetic filler gradient.

In another embodiment, a method of manufacturing a functionally graded article, comprises: modifying a magnetic filler; preparing a melted polymer mixture comprising a thermoplastic polymer and the modified magnetic filler, wherein the magnetic filler is dispersed in the thermoplastic polymer; molding the melted polymer mixture; and applying a magnetic field to a portion of the melted polymer mixture to form the functionally graded article, wherein the functionally graded article has a magnetic filler gradient.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Disclosed herein, in various embodiments, are methods for manufacturing functionally graded polymer materials.

As described herein, a functionally graded polymer refers to materials having a polymer matrix and which exhibit spatial variations in composition and/or microstructure through the volume of the polymer matrix. The structure of the functionally graded polymer results in continuously or discretely changing properties (e.g., thermal, mechanical, chemical, functional, visual properties, or a combination comprising at least one of the foregoing). Functionally graded materials are ideal candidates for applications involving extreme thermal gradients, ranging from thermal structures in space shuttles to cutting tool inserts.

A method for manufacturing functionally graded polymer materials can comprise a gradient of filler that is either magnetic or which can be influenced by a magnetic field. The functionally graded polymer materials can be formed by preparing a melted polymer mixture comprising a thermoplastic polymer and a magnetic filler dispersed in the polymer, molding the melted polymer mixture, and subsequently applying a magnetic field to a portion of the melted polymer mixture.

The magnetic field can be applied at strategic portions, e.g. locations, of the melted polymer mixture to facilitate the formation of a filler gradient at localized positions within the polymer matrix. The magnetic field alters distribution of the magnetic filler within the molten polymer to concentrate the magnetic filler in a select region of the polymer matrix. The location of the gradient in the functionally graded polymer mixture can vary based upon the placement of the magnetic field. In this manner, a functionally graded polymer material can be prepared from a single, homogeneous polymer mixture.

The magnetic fields disclosed herein are in addition to those produced by the earth's magnetic field. In general, a magnetic field is the region in the area of a magnet, an electric current, or a changing electric field, in which magnetic forces are observed. Magnetic field strength, or magnetic field intensity, corresponds to the density of magnetic field lines (e.g. lines of magnetic force) surrounding the magnet. Magnetic flux refers to the total number of magnetic field lines penetrating a given material, while the magnetic flux density refers to the number of lines of magnetic force that pass through a plane of a given area at a right angle. The flux density is equal to the magnetic field strength times the magnetic permeability in the region in which the field exists.

The magnetic field can be applied to the melted polymer mixture using a magnet. Various types of magnets can be used including, for example, a permanent magnet, an electromagnet, a superconductive electromagnet, or a combination comprising at least one of the foregoing magnets. Permanent magnets are made from a magnetized material that creates a persistent magnetic field. An electromagnet is made from a coil of wire around a core of ferromagnetic material. As an electric current passes through the wire, a magnetic field is generated and is enhanced by the ferromagnetic material. In an electromagnet, the magnetic field is produced by the flow of electric current through the wire. A superconducting magnet is an electromagnet made from coils of superconducting wire. The superconducting wire is capable of conducting larger electric currents as compared to wire materials wrapped around ordinary electromagnets. As a result, superconductive magnets are capable of generating intense magnetic fields.

The magnet can be disposed adjacent to a portion of the melted polymer mixture such that a magnetic field passes through the mixture (e.g., through a desired region of the mixture or the whole mixture) and alters distribution of the magnetic filler within the molten polymer. To do so, the magnet can be positioned in a manner that will enable contact between the melted polymer mixture and the magnet field. For example, the magnet can be strategically placed within the mold, and as the melted polymer mixture flows into the mold, the mixture comes into contact with the magnet field. Alternatively, the melted polymer mixture can be allowed to fill the mold and the magnet can then be strategically positioned adjacent to a portion of the melted polymer mixture. The particles of magnetic filler, under the influence of the magnetic field, are drawn through the molten polymer mixture along magnetic field lines in the direction of the magnet e.g. the source of the magnetic field. That is, the magnetic field alters distribution of the magnetic filler within the molten polymer to concentrate the magnetic filler in an area of the polymer. As a result a magnetic filler gradient is formed. The position of the magnet with relation to the polymer matrix during molding of the melted polymer mixture therefore can determine the location at which the filler gradient will be formed in the polymer matrix.

The specific magnetic intensity desired for a given application can readily be determined based upon the type polymer (e.g., the viscosity), the thickness of the area to be functionally graded, and the type of polymer.

The filler gradient can be formed through a thickness of the functionally graded polymer material. In this context, a filler gradient refers to the rate at which the filler amount increases or decreases across a thickness of the functionally graded polymer material. The method can be used to form functionally graded polymer materials having a gradient in filler particle size, composition, and/or density. For example, the method can provide a gradient in filler density from a first surface (e.g. an inner or outer surface) to a second surface (e.g. outer or inner surface) of the functionally graded polymer material such that the filler density at the first surface of the polymeric material is the greatest, and the filler density at the second surface (e.g. opposite the first surface) is the lowest. Stated another way, the filler can be concentrated at or near a surface of the functionally graded polymer.

The filler gradient can be formed across the entire thickness (e.g. 100%), or alternatively, across a portion (e.g. region) of the thickness of the functionally graded polymer material. For example, the filler gradient can be formed across 10% to 25% of the thickness, more specifically across 25% to 33% of the thickness, even more specifically 33% to 50% of the thickness, and yet even more specifically 50 to 75% of the thickness of the functionally graded polymer material.

The distribution and concentration of the magnetic filler in the molten polymer can be controlled by varying parameters such as the magnetic field strength, magnetic field pattern, magnetic field direction, and a combination comprising at least one of the foregoing parameters. Additional process parameters that can also affect the distribution of the magnetic filler once the magnetic field is applied to the melted polymer mixture include, but are not limited to, melt temperature, mold surface temperature, rate of cooling, the point of injection, the velocity at which the polymeric material is injected into the mold (i.e. injection speed), and the viscosity of the melted polymer mixture. The specific parameters, which are dependent upon the specific polymer and the specific magnetic filler, can readily be determined by an artisan without undue experimentation.

The magnetic field can be applied prior to the curing or hardening of the melted polymer mixture. Following the magnetic orientation of the filler, the melted polymer material in the mold can then be cured or hardened in order to fix the filler within the polymer matrix and form the functionally graded polymer material.

As described herein, methods of manufacturing a functionally graded polymer material can include preparing a melted polymer mixture comprising a polymer (e.g., thermoplastic polymer) and magnetic filler dispersed therein. The polymer can be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at least one of the foregoing. The polymer can also be a blend of polymers, copolymers, terpolymers, or combinations comprising at least one of the foregoing thermoplastic polymers.

Examples of the thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, or a combination comprising at least one of the foregoing thermoplastic polymers.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or a combination comprising at least one of the foregoing thermoplastic polymer blends.

More particularly, the thermoplastic polymer used in the core composition can include, but is not limited to, polycarbonate resins (e.g., LEXAN™ resins, commercially available from SABIC's Innovative Plastics business), polyphenylene ether-polystyrene blends (e.g., NORYL™ resins, commercially available from SABIC's Innovative Plastics business), polyetherimide resins (e.g., ULTEM™ resins, commercially available from SABIC's Innovative Plastics business), polybutylene terephthalate-polycarbonate blends (e.g., XENOY™ resins, commercially available from SABIC's Innovative Plastics business), copolyestercarbonate resins (e.g. LEXAN™ SLX resins, commercially available from SABIC's Innovative Plastics business), acrylonitrile butadiene styrene resins (e.g., CYCOLOY™ resins, commercially available from SABIC's Innovative Plastics business) and combinations comprising at least one of the foregoing resins.

The filler can be a magnetic filler, or alternatively, one that can be influenced by a magnetic field. Fillers generally fall into one of four different categories with regard to their susceptibility to a magnetic field: ferromagnetic, paramagnetic, diamagnetic, and non-magnetic. Ferromagnetic fillers have a strong susceptibility and attraction to a magnetic field and can retain magnetic properties once the field is removed. Paramagnetic fillers are those that have a low susceptibility to and are weakly influenced by a magnetic field. Diamagnetic fillers are negligibly affected by magnetic fields, and can be slightly repelled by a magnetic field, while non-magnetic fillers are those having essentially no susceptibility to a magnetic field whatsoever. The magnetic state (or phase) of a material can be affected by variables such as, for example, temperature, applied pressure, the applied magnetic field, and the like. The filler should be influenced by a magnetic field to a degree that attains (for the magnetic field being used) the desired gradation in the article.

The magnetic fillers disclosed herein are responsive to magnetic fields. Any metal that is magnetic or can be influenced by a magnetic field can be used as the metal coating of the metal-coated fiber. Examples of such magnetic fillers include iron, nickel, cobalt, vanadium, molybdenum, combinations including at least one of the foregoing, specifically, vanadium, and molybdenum. Examples of alloys include Alnico (magnet alloy comprising aluminum, iron, cobalt and nickel), steel, samarium cobalt (SmCo), neodymium iron boron (NdFeB), ferrites, $Fe_2O_3$ ($FeOFe_2O_3$, $NiOFe_2O_3$, $CuOFe_2O_3$, $MgOFe_2O_3$, etc.), MnBi, MnSb, Awaruite ($Ni_2Fe$ to $Ni_3Fe$), CoFe, $CrO_2$, MnAs, and a combination comprising at least one of the foregoing alloys. Alloys that include a combination of magnetic materials and non-magnetic materials may also be used. The non-magnetic portion present in the alloys may be metals, ceramics, or polymers.

The magnetic fillers can have various physical forms and chemical forms. Any of these various physical or chemical forms can be used. For example, the magnetic filler can be in the form of magnetic particles. The magnetic particles can be present in the form of rods, tubes, whiskers, fibers, platelets, spheres, cubes, or the like, or other geometrical forms, as well as combinations comprising at least one of the foregoing. The magnetic filler can be an unmodified filler. Alternatively, the magnetic filler can be a modified magnetic filler. The magnetic fiber can comprise metal filler, metal-coated filler, or a combination thereof. Examples of core materials for the metal-coated fiber can include vitreous mineral such as glass, silicates of aluminum, silicates of magnesium, silicates of calcium, and the like; and inorganic carbon materials such as graphite, carbon powders, carbon fibers, mica, and the like; as well as combinations comprising at least one of the foregoing. The metal coating (which can be an encapsulant) can be any of the metals mentioned above as magnetic materials.

The magnetic filler can be at least partially coated or encapsulated with various polymer materials. Coating of the magnetic filler with a polymer material can, for example, improve compatibility between the magnetic filler and the polymer matrix. Alternatively, the coating or encapsulating polymer material can be selected to minimize compatibility between the filler and the thermoplastic polymer depending upon the desired outcome. Examples of polymer materials that can be used to coat the magnetic filler comprise siloxane based materials, organic materials (e.g., aliphatic or aromatic) with different functional moieties such as —COOR, —$CH_3$, —$NH_2$, —CO—R—CO, or a combination comprising at least one of the foregoing coating polymer materials. R can be alkyl or aryl or halo groups.

Various types of additional materials can also be used to encapsulate the magnetic filler. Materials that can be used to encapsulate the magnetic filler comprise silicone rubbers, polymeric materials (such as acrylonitrile-butadiene-styrene (ABS), ethylene propylene diene monomer (EPDM), styrene-acrylonitrile (SAN), and combinations comprising at least one of the foregoing. Examples of such materials include fine filler particles such as titanium dioxide ($TiO_2$), talc, calcium carbonate, and a combination comprising at least one of the foregoing encapsulating or coating materials.

By chemically modifying (e.g. functionalizing) the magnetic fillers with functionalizing elements, different types of properties can be achieved across the filler gradient. The fillers can be functionalized by chemically attaching materials directly to the fillers. The functionalizing agent is selected to react with functional groups on the surface of the filler. Examples of functionalizing materials comprise diallyl based moieties, vinyl functionalized based monomer or polymer, siloxane based materials (e.g., with different functionalities such as COOR, $COOCH_3$, $NH_2$ (e.g., $CONH_2$), $NHR_2$, R—CHO, R—CO—R, wherein R may be an alkyl or aryl groups), or a combination comprising at least one of the foregoing functionalizing materials.

Aggregates and agglomerates of the magnetic particles are also envisioned. The particles can have average dimensions in the nanometer range or in the micrometer range. The nanometer range generally includes particle sizes of less than or equal to 100 nanometers, while the micrometer range generally includes particle sizes of greater than 100 nanometers. The specific size is chosen based upon the desired final properties.

The length of the magnetic fiber can be up to 30 millimeters (mm) prior to molding (e.g., up to 15 mm for injection molding, and up to 30 mm for extrusion). Specifically, the length of the magnetic fiber can be at least 3 mm, more specifically at least 5 mm, and even more specifically, at least 10 mm prior to molding. The length of the magnetic fiber can be up to 15 mm, or up to 20 mm prior to molding. After molding, the length of the magnetic fiber can be less than specified above. For example, after molding, the length of the metal fiber can be 30 micrometers (μm) to 3 mm.

The magnetic filler can be present in an amount of 0.01 to 15 wt %, specifically, 0.01 to 10 wt %, and more specifically 0.01 to 5 wt %, based on the total weight of the melted polymer mixture.

One or more additives ordinarily incorporated into polymer compositions of this type can also be employed, with the provision that the additive(s) are selected so as to not significantly adversely affect the desired properties of the material. Such additives can be mixed at a suitable time during the mixing of the components for forming the melted polymer mixture. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, radiation stabilizers (e.g., infrared absorbing), flame retardants, and anti-drip agents. A combination of additives can be used, for example a combination of a flame retardant heat stabilizer, mold release agent, and ultraviolet light stabilizer. In general, the additives can be used in the amounts generally known to be effective.

The polymer resin (e.g., matrix) along with the magnetic filler and other additional additives can be compounded in any commercially available production device such as, for example, an extruder, roll mill, dough mixer, etc. The polymer can be initially in the form of powder, strands or pellets, and can be pre-compounded with the magnetic filler in a Henschel mixer or any other type of mixer. The pre-compounded mixture can then be extruded at a suitable temperature into a strand that is quenched and pelletized. Alternately, the polymeric resin can be directly added to the extruder with the magnetic filler added either concurrently or sequentially into the extruder. Extruder temperature is generally sufficient to cause the polymeric resin to flow so that proper dispersion of the magnetic filler in the thermoplastic polymer can be achieved.

Generally the functionally graded material can comprise exposing a molten polymer comprising the magnetic filler, to a magnetic force. The magnetic force creates motion of the magnetic filler. The polymer is then allowed to cool to form the graded article. For example, a powdered polymer resin (e.g., thermoplastic polymer resin) is blended with magnetic filler (e.g., in a mixer (such as a Henschel high speed mixer), in an extruder (e.g., a twin screw extruder), or otherwise). The blend is then formed into pellets for later use or can be formed into the desired shape (injection molded to form an article, extruded to form a sheet, etc.). If the pellets are first formed, they are later melted and the article is formed accordingly. Once the article is formed, and while the blend is still in the molten state, the magnetic field is used to adjust the concentration of magnetic filler in various areas of the article (e.g., to draw them toward the surface to attain a particular protection on that side of the article. This allows a lower amount of material to be employed while attaining the same level of protection since the concentration of filler on a side of the article (or in a particular area of the article) can be much higher than the remainder of the article. In other words, it is not necessary to increase the concentration throughout the article in order to attain a certain concentration in a given location.

The melted polymer mixture can be prepared by subjecting pellets formed as a result of extrusion, or a conductive sheet obtained from a roll mill, to a molding (e.g. forming) process. In some instances the extruded mixture of thermoplastic polymer and magnetic filler can be the melted polymer mixture.

Molding of the melted polymer mixture can include the transfer of the melted polymer mixture into the mold. Examples of molding processes include injection molding, blow molding, sheet extrusion, profile extrusion, wire drawing, pultrusion, or a combination comprising at least one of the foregoing processes.

The magnet is positioned in a manner that will enable contact between the melted polymer blend and the magnetic field. Following molding of the melted polymer blend, the magnet can be disposed adjacent to a portion of the melted polymer blend such that a magnetic field passes through the blend and alters distribution of the magnetic filler within the blend. Alternatively, the magnet can be placed within the mold at the desired position for forming the filler gradient prior to molding of the melted polymer mixture. As the melted polymer blend flows into the mold, the blend comes into contact with the magnet field. A combination of the afore-mentioned methods is also envisioned. For example, a first magnet can be placed within the mold prior to molding of the melted polymer blend, and an additional magnet(s) can be placed adjacent to the melted polymer blend at a position separate and apart from the first magnet. The first magnet and the second magnet are positioned in a manner such that the magnetic fields produced by each magnet are non-overlapping, and distinct filler gradients are formed.

Alternatively, or in addition, relative motion can be created between the melted polymer blend and the magnetic field (e.g., the blend can be on a carrier and conveyed past the magnetic field), e.g., in a sheet forming process.

In the present methods, the magnet applies a magnetic field to the melted polymer blend. The particles of magnetic filler, under the influence of the magnetic field, are drawn through the molten polymer mixture along magnetic field lines in a direction influence by the magnetic field. As a result, the magnetic filler gradient is formed. The position of the magnet with respect to the molten polymer blend therefore determines the location at which the filler gradient will be formed.

The magnetic field can be applied prior to curing or hardening of the melted polymer blend. Following the application of the magnetic field and orientation of the magnetic filler, the melted polymer mixture is cooled (e.g., solidified) and optionally cured to form a molded article.

The present process can use a magnetic flux to induce gradation of magnetic fillers in a polymer. The gradation can be engineered by controlling magnetic flux and/or mold surface temperature, and/or melted polymer temperature. The fillers can be used, e.g., as functionalizing elements, to achieve a different property at different locations (e.g., across a thickness and/or in different areas) of an article. For example, an article can have one side that is polymer rich, and another side that is filler (e.g., carbon and/or metal (such as ferrous)) rich.

Finally, whether or not the filler aligns (e.g., fibers align in a common direction), can be controlled depending upon whether or not alignment is desired. The alignment can be controlled by controlling the current, direction, and the strength of the flux, thereby controlling the effect of the flux on the filler.

Molded articles comprising functionally graded polymer materials manufactured as described herein are also provided. This process enables controlled property variation within an article, thereby enabling the production of numerous product that could not be produced as a single layer previously. The articles can be used, for example, in aerospace applications, electronics, structural products, optical devices, medical implants, protective layers, and so forth, such as thermal gradients (e.g., thermal structures in for example, space shuttles, cutting tool inserts, engine or turbine films, and so forth). Examples of articles include a heat sink (e.g., with directionally oriented magnetic fibers (i.e., greater than or equal to 80% of the fibers are oriented along the same axis)); layer with an internal antenna; layer with an internal trace (e.g., for a defroster, semiconductor, etc.). The functionally graded polymer materials can also be used to form articles for which an automotive Class A surface is desired.

Set forth below are some examples of the methods and articles disclosed herein.

Embodiment 1: A method of manufacturing a functionally graded article, comprising: preparing a melted polymer mixture comprising a thermoplastic polymer and a magnetic filler, wherein the magnetic filler is dispersed in the thermoplastic polymer; molding the melted polymer mixture; and applying a magnetic field to a portion of the melted polymer mixture to form the functionally graded article, wherein the functionally graded article has a magnetic filler gradient.

Embodiment 2: A method of manufacturing a functionally graded article, comprising: modifying a magnetic filler; preparing a melted polymer mixture comprising a thermoplastic polymer and the modified magnetic filler, wherein the magnetic filler is dispersed in the thermoplastic polymer; molding the melted polymer mixture; and applying a magnetic field to a portion of the melted polymer mixture to form the functionally graded article, wherein the functionally graded article has a magnetic filler gradient.

Embodiment 3: The method of any of Embodiments 1-2, wherein the magnetic field alters distribution of the magnetic filler within the molten polymer to concentrate the magnetic filler in an area of the polymer.

Embodiment 4: The method of any of Embodiments 1-3, wherein the filler gradient is formed through a thickness of the functionally graded article.

Embodiment 5: The method of any of Embodiments 1-4, wherein the magnetic field draws the magnetic filler through the molten polymer towards a magnetic field source.

Embodiment 6: The method of any of Embodiments 1-5, wherein the molding comprises injection molding, blow molding, sheet extrusion, profile extrusion, wire drawing, or a combination comprising at least one of the foregoing processes.

Embodiment 7: The method of any of Embodiments 1-6, wherein the magnetic field is applied using a permanent magnet, an electromagnet, a superconductive electromagnet, or a combination thereof.

Embodiment 8: The method of any of Embodiments 1-7, wherein a temperature of the melted polymer mixture during the molding is 120 to 400° C.

Embodiment 9: The method of any of Embodiments 1-8, wherein the magnetic filler is modified by coating, encapsulation, chemical modification, functionalization, or a combination comprising at least one of the foregoing.

Embodiment 10: The method of Embodiment 8, wherein the magnetic filler is modified with a material comprising polyetherimide.

Embodiment 11: The method of any of Embodiments 1-10, wherein the magnetic field is applied prior to curing or hardening of the melted polymer mixture.

Embodiment 12: The method of any of Embodiments 1-11, wherein the magnetic filler comprises iron, nickel, cobalt, ferrites, rare earth magnets, or a combination comprising at least one of the foregoing.

Embodiment 13: The method of any of Embodiments 1-12, wherein the magnetic filler comprises magnetic particles, magnetic fibers, or a combination comprising at least one of the foregoing.

Embodiment 14: The method of any of Embodiments 1-13, wherein the magnetic fibers are metal fibers, metal-coated fibers or a combination of metal fibers and metal-coated fibers.

Embodiment 15: The method of any of Embodiments 1-14, wherein the method further comprises modifying a surface of the magnetic filler prior to preparing the melted polymer mixture.

Embodiment 16: The method of any of Embodiments 1-15, further comprising controlling the temperature of the melted polymer.

Embodiment 17: The method of Embodiment 16, wherein controlling the temperature of the melted polymer comprises maintaining the melted polymer in a melted state until the functionally graded article has attained a desired functional gradation.

Embodiment 18: The method of Embodiment 16, wherein controlling the temperature of the melted polymer comprises heating the mold to within 10° C. of a melt temperature of the thermoplastic polymer.

Embodiment 19: The method of Embodiment 16, wherein controlling the temperature of the melted polymer comprises maintaining the melted polymer at a temperature within 10° C. of its melt temperature.

Embodiment 20: The method of any of Embodiments 1-19, wherein the melted polymer mixture comprises polycarbonate, polyethylene, polypropylene, polystyrene, polybutylene terephthalate, polylactic acid, and combinations comprising at least one of the foregoing.

Embodiment 21: An article formed by the method of any of Embodiments 1-20.

Embodiment 22: The article of Embodiment 21, wherein article is used for electromagnetic interference (EMI) shielding.

Embodiment 23: The article of Embodiment 21, wherein the magnetic filler gradient forms an antenna within the article.

Embodiment 24: The article of Embodiment 21, wherein the article is a heat sink with directionally oriented magnetic fibers.

Embodiment 25: The article of Embodiment 24, wherein the filler is fibers and greater than or equal to 70%, or 80%, or 90% of the fibers are oriented along one axis.

The methods of manufacturing a functionally graded polymer composition are further illustrated by the following, non-limiting examples.

EXAMPLES

Example 1

A small quantity (10 wt % based upon a total weight of the paste) of steel powder (having a particle size of 180 micrometers) dispersed in polyvinyl alcohol (PVA) paste was subjected to a strong magnetic field using a AlNiCo Pot magnet in an aluminum casting, having a 40 kilograms (kg) of holding force in 50 mm diameter. The paste was exposed to the magnet for 35 to 40 seconds.

Figure 1:
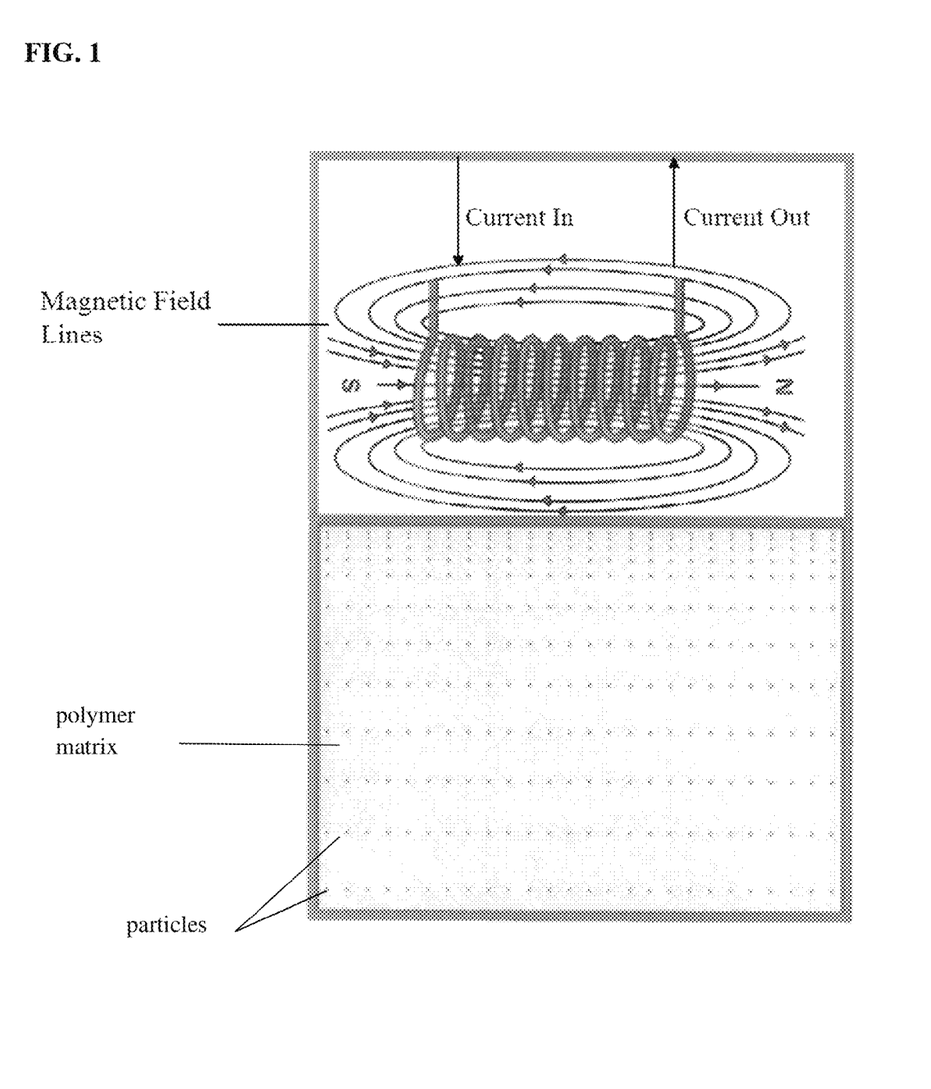
FIG. 1 is an illustration of an exemplary electromagnet induction mechanism and the gradation of magnetic fillers in the polymer matrix.
Figure 2:
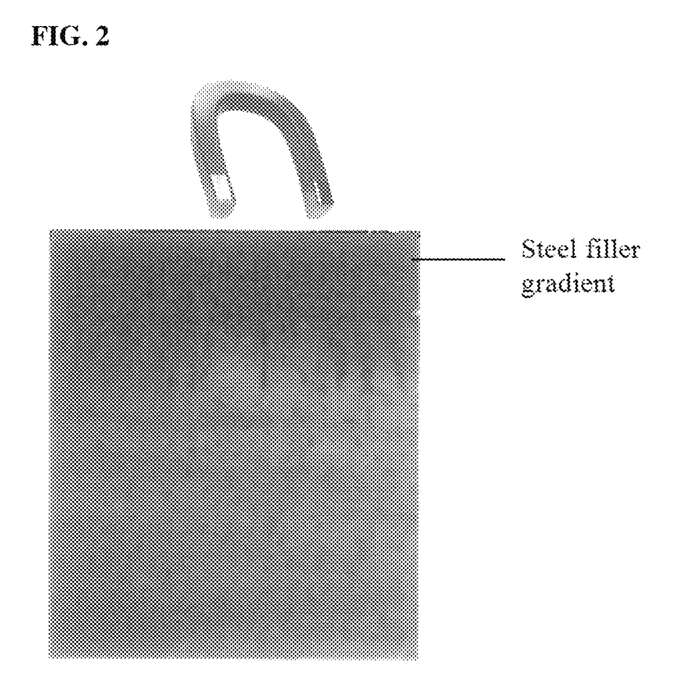
FIG. 2 is an image showing the arrangement of migrated steel particles in polyvinyl acetone (PVA) paste following the application of a magnetic field.

FIG. 2 shows the arrangement of the steel powder in the PVA paste following exposure of the paste to the magnetic field. As shown in FIG. 2, the steel powder migrated through the viscous PVA paste to a position adjacent to where the magnet was placed. The steel particles having a black color appear to be arranged as a gradient in the PVA paste.

To evaluate whether migration of steel powder occurs in a polymer melt, polybutylene terephthalate (PBT) was melted (weight average molecular weight (Mw) of 55,000-

Figure 3:
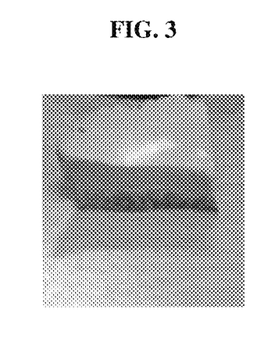
FIG. 3 is an image showing a section of a molded polymer cast in an aluminum mold.

60,000 grams per mole (g/mole)), mixed with steel powder, and then cast into aluminum cups. The cups were then subjected to a strong magnetic field using neodymium magnets (30 square millimeter ($mm^2$) with holding force of 60 kg (kilograms)). Sections removed from the cups clearly showed influence of magnetic flux on the casted part. FIG. 3 shows the casted samples and a section of the PBT and steel powder.

Example 2

Experiments were conducted to confirm whether migration of the magnetic filler, e.g. steel powder, occurs when a magnetic field is applied under process conditions of high shear such as injection molding.

PBT and 10 wt % steel powder were compounded together in a ZSK extruder (Weiner & Pfleiderer) under the conditions shown in Table 1 and formed into pellets.

TABLE 1

| Barrel | 1 | 2 | 3 | 4 | 5 | 6 | 7 | 8 | 9 | 10 |
|---|---|---|---|---|---|---|---|---|---|---|
| Temp (° C.) | 200 | 230 | 240 | 250 | 250 | 250 | 250 | 250 | 255 | 260 |

The PBT/steel pellets were fed into a heated barrel of an injection molding machine (L/T/ Demag 200T), mixed, and injected into a mold having a steel cavity with an aluminum core, and an AlNiCo pot magnet incorporated into the mold. The molding conditions used are shown below and in Tables 2 and 3.

TABLE 2

| Zone | Nozzle | MH3 | MH2 | MH1 | Feed | Mold Temperature |
|---|---|---|---|---|---|---|
| Temp (° C.) | 260 | 270 | 255 | 240 | 60 | 65 |

TABLE 3

| | |
|---|---|
| Injection pressure (bar) | 95 |
| Injection speed (mm/sec) | 5 |
| Injection time (sec) | 10 |
| Back Pressure 1 (bar) | 5 |
| Back Pressure 2 (bar) | 5 |
| Hold On Pressure (bar) | 60 |
| Screw speed (%) | 20 |
| Switch over pressure (bar) | 60 |
| Cooling (sec) | 5 |
| Hold On time (sec) | 12 |
| Cycle Time (sec) | 35-40 |
| Dosing (mm) | 55 |
| Melt cushion (mm) | 3.8 |

Polypropylene (PP) and 10 wt % steel powder were compounded together in a ZSK extruder under the conditions shown in Table 4 and formed into pellets.

TABLE 4

| Barrel | 1 | 2 | 3 | 4 | 5 | 6 | 7 | 8 | 9 | 10 |
|---|---|---|---|---|---|---|---|---|---|---|
| Temp (° C.) | 100 | 180 | 180 | 180 | 190 | 190 | 200 | 200 | 200 | 210 |

The PP/steel pellets were fed into a heated barrel of an injection molding machine (L/T/ Demag 200T), mixed, and injected into a mold having a steel cavity with an aluminum core, and an AlNiCo pot magnet incorporated into the mold. The molding conditions used are shown below and in Tables 5 and 6.

TABLE 5

| Zone | Nozzle | MH3 | MH2 | MH1 | Feed | Mold Temperature |
|---|---|---|---|---|---|---|
| Temp (° C.) | 200 | 210 | 195 | 185 | 60 | 60 |

TABLE 6

| | |
|---|---|
| Injection pressure (bar) | 150 |
| Injection speed (mm/sec) | 130 |
| Injection time (sec) | 0.7 |
| Back Pressure 1 (bar) | 5 |
| Back Pressure 2 (bar) | 5 |
| Hold On Pressure (bar) | 45 |
| Screw speed (%) | 16 |
| Switch over pressure (bar) | 60 |
| Cooling (sec) | 10 |
| Hold On time (sec) | 12 |
| Cycle Time (sec) | 35-40 |
| Dosing (mm) | 55 |
| Melt cushion (mm) | 3.8 |

Figure 4:
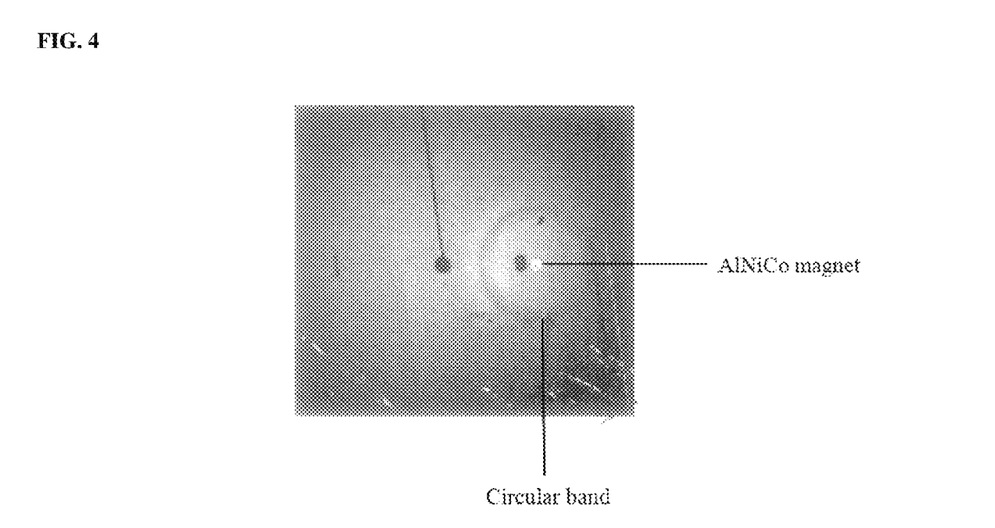
FIG. 4 is an image showing an exemplary position of an Alnico pot magnet in a molded polypropylene sample with a circular band of magnetic filler surrounding the magnet.
Figure 5:
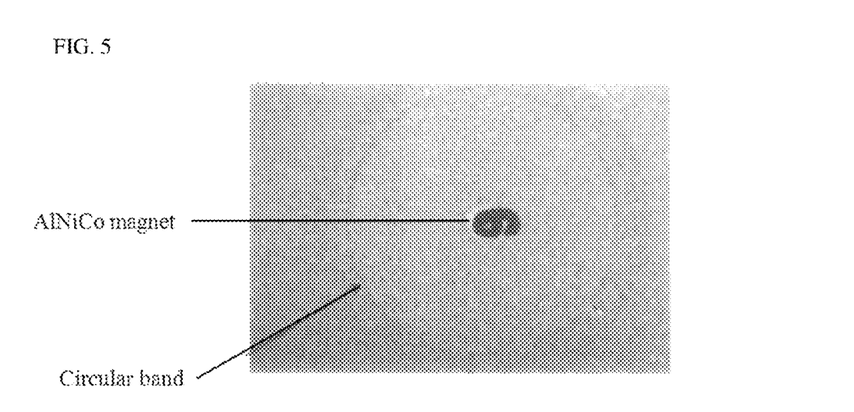
FIG. 5 is an image showing an exemplary position of an Alnico pot magnet in a molded polybutylene terephthalate sample with a circular band of magnetic filler surrounding the magnet.

The molded PBT and PP samples were each subjected to X-ray imaging to analyze the density of steel particles in the area surrounding the position of the AlNiCo magnet. As shown in FIG. 4, annular rings composed of steel filler were formed near and around the position of the magnet within the mold, indicating the influence of the magnetic force on the distribution of the steel filler during the molding process.

Figure 6:
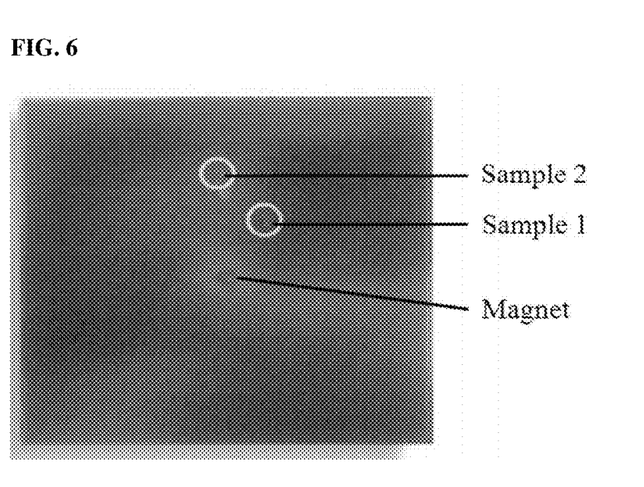
FIG. 6 is an image showing the position of polymer Samples 1 and 2 relative to the position of the magnet.

Thermogavimetric analysis (TGA) was performed on two different regions of the molded samples of PP. The first sample (Sample 1) was taken from a region of the molded sample close to the position of the magnet, while the second sample (Sample 2) was taken from a region a further away from the magnet. (See FIG. 6) The TGA showed that the concentration of steel powder (residue) in Sample 1 was 13.80 wt %, while the concentration of steel powder in Sample 2 was 9.846 wt %. The TGA analysis therefore indicates that the amount of steel present at any given point in the molded composition is dependent upon the proximity of that point to the magnet, and demonstrates the influence of the applied magnetic flux on the distribution of the steel filler.

Figure 7:
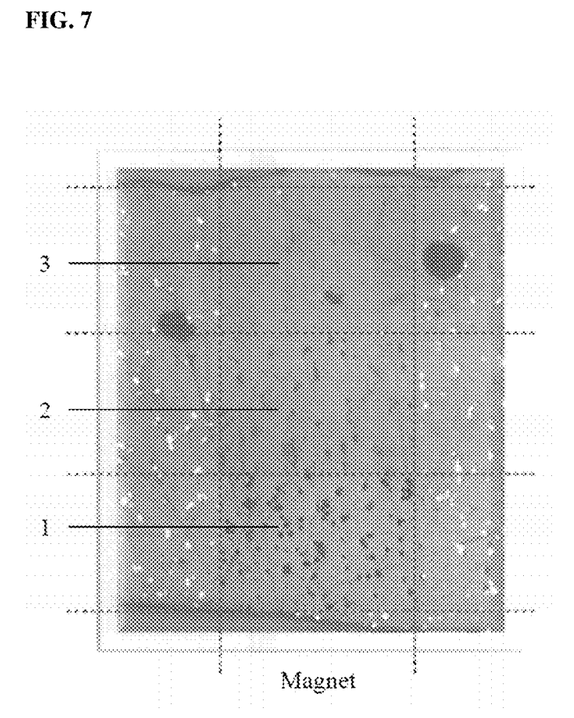
FIG. 7 is a an image of a molded polymer containing steel filler indicating regions 1, 2, and 3 that were analyzed by optical microscopy to determine the localized concentration of the steel filler.
Figure 8:
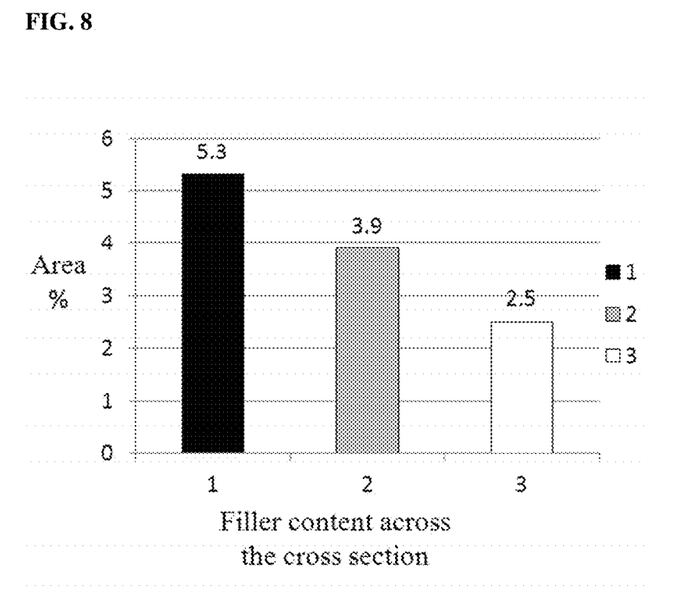
FIG. 8 is a graph showing the concentration of steel filler present in each of regions 1, 2, and 3.

Three different regions of the molded polymer sample were analyzed using optical microscopy to determine the concentration of steel filler present within each region. The first region (1) was in a position directly adjacent to the pot magnet, with regions (2) and (3) being at increasing distances from the magnet. As shown in FIG. 7, the optical microscopy results on the molded sample clearly shows the graded structure of the filler. As further presented in FIG. 8, the amount of steel filler ranged from 5.3 wt %, to 3.9 wt %, to 2.5 wt % for regions (1), (2) and (3) respectively. (The amount of fillers was calculated in the optical microscope and derived.) Thus the results show that the concentration of steel filler in the molded polymer sample decreased with increasing distance from the magnet resulting in a filler gradient in the polymer.

Example 3

Experiments are conducted to confirm whether migration of the magnetic filler occurs using polymer-coated magnetic filler.

Steel powder (10 wt %) is combined with a solution of 10 wt % polyetherimide (PEI)(Ultem™ resin commercially available from SABIC's Innovative Plastics business) in dichloromethane (DCM) and mixed in a shaker to coat the steel particles with the PEI. PBT powder is added to the mixture and the mixture is dried. The dried blend of PEI-coated steel and PBT is then subjected to injection molding.

In addition to PBT, polymers such as poly(lactic) acid (PLA), polycarbonate (PC), polyethylene (PE), polypropylene (PP), and polystyrene (PS) are also tested as described above.

In general, the invention may alternately comprise (e.g. include), consist of, or consist essentially of, any appropriate components herein disclosed. The embodiments may additionally, or alternatively, be formulated so as to be devoid, or substantially free, of any components, materials, ingredients, adjuvants or species used in the prior art compositions or that are otherwise not necessary to the achievement of the function and/or objectives of the present invention.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A method of manufacturing a functionally graded article, comprising:
    modifying a magnetic filler with at least one of a functionalization material and an encapsulating material;
    preparing a melted polymer mixture comprising a thermoplastic polymer and the magnetic filler, wherein the magnetic filler is dispersed in the thermoplastic polymer, wherein the magnetic filler is present in an amount of 0.01 to 15 wt % based on the total weight of the melted polymer mixture;
    injecting the melted polymer mixture into a mold; and
    applying a magnetic field from a magnet incorporated into the mold to a portion of the melted polymer mixture to form the functionally graded article, wherein the functionally graded article has a magnetic filler gradient.

2. The method of claim 1, wherein the magnetic field alters distribution of the magnetic filler within the molten polymer to concentrate the magnetic filler in an area of the polymer.

3. The method of claim 1, wherein the filler gradient is formed through a portion of a thickness of the functionally graded article, wherein the portion of the thickness is less than the entire thickness of the functionally graded article.

4. The method of claim 1, wherein the magnetic field draws the magnetic filler through the molten polymer towards a magnetic field source.

5. The method of claim 1, wherein the molding comprises injection molding.

6. The method of claim 1, wherein the magnetic field is applied by a magnet placed within the mold.

7. The method of claim 1, wherein a temperature of the melted polymer mixture during the molding is 120 to 400° C.

8. The method of claim 1, wherein the magnetic filler is further modified by coating, chemical modification, or a combination comprising at least one of the foregoing.

9. The method of claim 1, wherein the magnetic field is applied prior to curing or hardening of the melted polymer mixture.

10. The method of claim 1, wherein the magnetic filler comprises iron, nickel, cobalt, ferrites, rare earth magnets, or a combination comprising at least one of the foregoing.

11. The method of claim 1, wherein the magnetic filler comprises magnetic particles, magnetic fibers, or a combination comprising at least one of the foregoing.

12. The method of claim 11, wherein the magnetic fibers are metal fibers, metal-coated fibers or a combination of metal fibers and metal-coated fibers.

13. The method of claim 1, wherein the functionalization material is selected from diallyl based moieties, vinyl functionalized based monomer or polymer, siloxane based materials, or combinations thereof, and wherein the encapsulating material is selected from titanium dioxide, talc, calcium carbonate, and combinations thereof.

14. The method of claim 1, further comprising controlling the temperature of the melted polymer, wherein controlling the temperature of the melted polymer comprises maintaining the melted polymer in a melted state until the functionally graded article has attained a desired functional gradation.

15. A method of manufacturing a functionally graded article, comprising:
    preparing a melted polymer mixture comprising a thermoplastic polymer and a magnetic filler, wherein the magnetic filler is dispersed in the thermoplastic polymer, and wherein the thermoplastic polymer has a thermoplastic polymer melt temperature;
    injecting the melted polymer mixture into a mold;
    controlling the temperature of the melted polymer, wherein controlling the temperature of the melted polymer comprises maintaining the melted polymer mixture at a temperature within 10° C. of the thermoplastic polymer melt temperature;

applying a magnetic field from a magnet incorporated into the mold to a portion of the melted polymer mixture to form the functionally graded article, wherein the functionally graded article has a magnetic filler gradient.

16. A method of manufacturing a functionally graded polymer material, comprising:

modifying a magnetic filler with a functionalization material, wherein the functionalization material is selected from diallyl based moieties, vinyl functionalized based monomer or polymer, siloxane based materials, or combinations thereof;

preparing a melted polymer mixture comprising a thermoplastic polymer and the modified magnetic filler, wherein the magnetic filler is dispersed in the thermoplastic polymer, wherein the magnetic filler is present in an amount of 0.01 to 15 wt % based on the total weight of the melted polymer mixture;

injecting the melted polymer mixture into a mold; and applying a magnetic field from a magnet incorporated into the mold to a portion of the melted polymer mixture to form the functionally graded polymer material, wherein the functionally graded polymer material has a magnetic filler gradient.

17. The method of claim 16, wherein the method of modifying the magnetic filler further comprises coating, encapsulation, or a combination thereof.

18. A method of manufacturing a functionally graded article, comprising:

preparing a melted polymer mixture comprising a thermoplastic polymer and a magnetic filler, wherein the magnetic filler is dispersed in the thermoplastic polymer;

injecting the melted polymer mixture into a mold with a magnet incorporated into the mold; and applying a magnetic field from the magnet to a portion of the melted polymer mixture as the melted polymer mixture flows into the mold, to form the functionally graded article, wherein the functionally graded article has a continuously changing magnetic filler gradient;

wherein the functionally graded article has a thickness and wherein the magnetic filler gradient is formed across a portion of the thickness, and wherein the portion of the thickness is less than the entire thickness.

19. The method of claim 1, wherein the functionally graded article has a continuously changing magnetic filler gradient.

* * * * *